United States Patent
Qian et al.

(10) Patent No.: US 11,358,124 B2
(45) Date of Patent: Jun. 14, 2022

(54) PREPARATION METHOD OF A NANOMETER METAL OXIDE SUPPORTED CARRIER BASED ON ANODIC OXIDATION

(71) Applicant: Shanghai Maritime University, Shanghai (CN)

(72) Inventors: Qun Qian, Shanghai (CN); Daolun Feng, Shanghai (CN); Yue Lin, Shanghai (CN)

(73) Assignee: SHANGHAI MARITIME UNIVERSITY, Shanghai (CN)

( * ) Notice: Subject to any disclaimer, the term of this patent is extended or adjusted under 35 U.S.C. 154(b) by 0 days.

(21) Appl. No.: 16/963,420

(22) PCT Filed: May 28, 2019

(86) PCT No.: PCT/CN2019/088781
§ 371 (c)(1),
(2) Date: Jul. 20, 2020

(87) PCT Pub. No.: WO2020/232731
PCT Pub. Date: Nov. 26, 2020

(65) Prior Publication Data
US 2022/0062863 A1    Mar. 3, 2022

(30) Foreign Application Priority Data

May 20, 2019 (CN) .......................... 201910417925.9

(51) Int. Cl.
*B01J 21/00* (2006.01)
*B01J 21/06* (2006.01)
(Continued)

(52) U.S. Cl.
CPC .......... *B01J 21/063* (2013.01); *B01J 35/004* (2013.01); *B01J 35/0013* (2013.01); *B01J 37/04* (2013.01);
(Continued)

(58) Field of Classification Search
None
See application file for complete search history.

(56) References Cited

U.S. PATENT DOCUMENTS 6,781,652 B1 * 8/2004 Nishi .................. G02F 1/13439
349/139
2010/0290974 A1    11/2010 Hu et al.

FOREIGN PATENT DOCUMENTS

CN       101625930 A       1/2010
CN       101891146 A   *  11/2010
(Continued)

OTHER PUBLICATIONS

CN-101891146-A—English translation (Year: 2010).*
(Continued)

*Primary Examiner* — Stefanie J Cohen
(74) *Attorney, Agent, or Firm* — Amster, Rothstein & Ebenstein LLP

(57) ABSTRACT

Disclosed is a preparation method of a nanometer metal oxide supported carrier based on anodic oxidation, comprising: Step 1: adding electrolyte to a reaction pool, and fixing the cathode and the anode oppositely, wherein the cathode is a metal plate that is identical to the nano-metal oxide, and the anode is a carrier metal material; Step 2: stirring the electrolyte at a constant speed, wherein the revolution speed is not lower than 500 rpm; Step 3: switching power on; setting the output voltage between 10 v and 50 v; and subjecting the metal plate of the anode to anodic oxidation reaction, wherein metal oxide nanotubes/nano particles are generated on the surface; under the action of stirring, the metal oxide nanotubes/nano particles on the anode surface are dissolved and shed off into the electrolyte; under the action of the electric field force, the dissolved and shed-off nano fragments migrate towards the cathode and are adhered to the surface of the cathode material, thereby forming a (Continued)

nano-metal oxide film. The film preparation method according to the disclosure offers advantages such as mild condition, simple instrumentation, easy operation, and low cost; the prepared film has a good load effect such that the metal oxide can hardly be shed off.

9 Claims, 1 Drawing Sheet

(51) Int. Cl.
      *B01J 35/00*        (2006.01)
      *B01J 37/34*        (2006.01)
      *C02F 1/32*         (2006.01)
      *C02F 1/72*         (2006.01)
      *B01J 37/04*        (2006.01)
      *C02F 101/30*      (2006.01)

(52) U.S. Cl.
      CPC ............... *B01J 37/348* (2013.01); *C02F 1/32* (2013.01); *C02F 1/725* (2013.01); *C02F 2101/308* (2013.01); *C02F 2305/10* (2013.01)

(56) References Cited

FOREIGN PATENT DOCUMENTS

| CN | 104475121 A | 4/2015 |
|---|---|---|
| CN | 106629813 A | 5/2017 |
| CN | 106654244 A | 5/2017 |
| CN | 108144620 A | 6/2018 |

OTHER PUBLICATIONS

International Search Report dated Feb. 20, 2020 from PCT International Appln. No. PCT/CN2019/088781.
Written Opinion dated Feb. 20, 2020 from PCT International Appln. No. PCT/CN2019/088781.
Tao et al., "Research on the Preparation and Photocatalytic Property of TiO2 Nanotubes Loaded Porous Ti Composite," Journal of University of South China (Science and Technology), vol. 31, No. 3, Sep. 2017, pp. 106-112, (with partial English language translation).

* cited by examiner

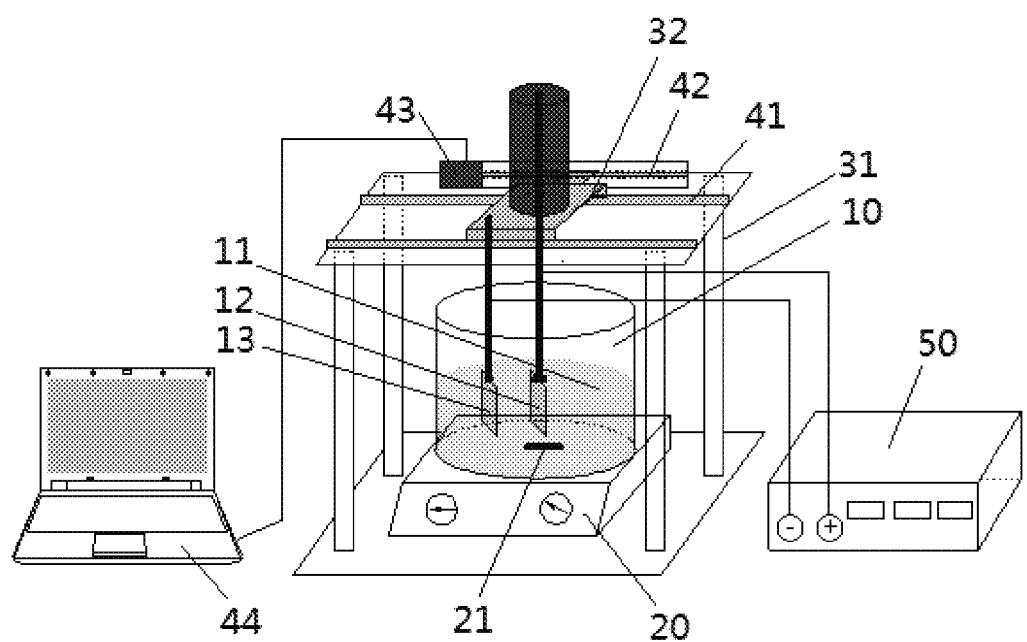

PREPARATION METHOD OF A NANOMETER METAL OXIDE SUPPORTED CARRIER BASED ON ANODIC OXIDATION

CROSS-REFERENCE TO RELATED APPLICATIONS

This application is a U.S. national stage entry under 35 U.S.C. § 371 of PCT International Patent Application No. PCT/CN2019/088781, filed May 28, 2019, which claims priority to Chinese Patent Application No. 201910417925.9, filed May 20, 2019, the contents of each of which are incorporated herein by reference in their entirety.

FIELD

Embodiments of the present disclosure generally relate to nano materials, and particularly relate to a preparation method of a nanometer metal oxide supported carrier based on anodic oxidation.

BACKGROUND

Nano-titanium dioxide (Nano-$TiO_2$), which has a capacity of converting light energy to chemical energy, can effectively degrade organic pollutants. Due to its properties such as high catalytic activity, good stability, low price, and no harm to humans, Nano-$TiO_2$ is considered as an environment-friendly photocatalytic material with great development prospect and application potential.

Nano-$TiO_2$ particles have a wide array of practical applications; however, they readily become agglomerated during preparation and use, which constrains effective play of their catalytic property. Further, after completion of degradation treatment, the nano particles are dispersed in the solution such that they can hardly precipitate freely and separate from the solution, which makes them difficult to be reclaimed and recycled.

To address the above issues, it has been contemplated to support the $TiO_2$ particles on various kinds of matrices. Metals, thanks to their properties of being easily shaped and processable in a variety of ways, become a special choice for carriers. Common supporting processes include: powder sintering, deposition, sputtering, and sol-gel process.

Powder sintering refers to: dissolving Nano-$TiO_2$ powder in water or alcoholic solvent to form a suspension; dipping a carrier into the suspension, stirring or dispersing with ultrasonic wave; after dipping for a certain time, a certain amount of photocatalyst being supported on the surface of the carrier; and then taking out the carrier for drying and sintering, thereby obtaining a photocatalytic $TiO_2$ supported material. This process requires preparing $TiO_2$ particles in advance and offers a poor load firmness.

Depositing refers to subjecting a titanium-containing reactive material to physiochemical reaction, wherein the generated $TiO_2$ is deposited on the carrier. Depositing is differentiated into liquid-phase deposition and chemical vapor deposition. The liquid-phase deposition has drawbacks that the prepared film is easily contaminated and the $TiO_2$ has a relatively low purity; while the chemical vapor deposition requires a stringent preparation condition and costs highly.

Sputtering refers to ionizing an inertia gas (e.g., argon) under the action of high-voltage electric field, then high-speed bombarding a target with resultant positive ions, causing the atoms or molecules of the target to be knocked out, i.e., sputtered, while the sputtered atoms or molecules are deposited on the carrier to form a film, resulting in a supported catalyst. This process generates high temperature during sputtering and costs highly.

The sol-gel process comprises dissolving an organic salt of titanium or a titanite compound as a starting material in a solvent, and obtaining a $TiO_2$ sol through hydrolysis, then applying the $TiO_2$ gel onto the carrier by dip-coating or spin-coating, and finally obtaining a supported catalyst through steps of gelling, aging, and thermal processing, etc. During the gelling and aging procedures, much water and organic solvent is evaporated, which not only causes environment pollution, but also causes $TiO_2$ film to be fractured.

In view of the above, the powder sintering process and the liquid-phase deposition process have a poor load effect, while the chemical vapor deposition process and the sputtering process require a stringent preparation condition and cost highly; the sol-gel process easily pollutes environment and is susceptible for fracturing due to inhomogeneous thermal contraction during the gelling process. Therefore, it is desirable to develop a new process to prepare a Nano-$TiO_2$ compound catalyst.

SUMMARY

An object of the present disclosure is to provide a low-cost preparation method for a nanometer metal oxide supported carrier, particularly a preparation method for a nano titanium dioxide compound catalyst.

To achieve the object above, the present disclosure provides a preparation method of a nanometer metal oxide supported carrier based on anodic oxidation, comprising:

Step 1: adding electrolyte to a reaction pool, and fixing cathode and anode oppositely, wherein the cathode is a metal plate identical to the nano-metal oxide, and the anode is a carrier metal material;

Step 2: stirring the electrolyte with a magnetic stirrer at a constant speed, wherein the revolution speed is not lower than 500 revolutions per minute;

Step 3: switching power on; setting the output voltage between 10 v and 50 v; and subjecting the metal plate of the anode to anodic oxidation reaction, wherein metal oxide nanotubes/nano particles are generated on the surface of the anode; with increase of oxidization time and under the action of stirring, the metal oxide nanotubes/nano particles on the anode surface are dissolved and shed off into the electrolyte; under the action of the electric field force, the dissolved and shed-off nano fragments migrate towards the cathode and are adhered to the surface of the cathode material, thereby forming a nano-metal oxide film.

The "metal oxide nanotubes/nano particles" herein refer to a mixture including metal oxide nano tubes and metal oxide nano particles.

Preferably, the electrolyte is selected from any one of 1M $(NH_4)_2SO_4$+0.5 wt % $NH_4F$, 1M $NaH_2PO_4$+0.3 wt % HF, 0.05M $NaClO_4$+0.05M NaCl, and 1M $Na_2SO_4$+0.5 wt % NaF; the symbol "+" represents combination or mixture, e.g., 1M $(NH_4)_2SO_4$+0.5 wt % $NH_4F$ represents a mixture of 1M $(NH_4)_2SO_4$ and 0.5 wt % $NH_4F$.

Preferably, the spacing between the cathode and the anode is maintained in a range from 0.5 cm to 25 cm.

Preferably, the anode is selected from any one of metal titanium, aluminum, tungsten, and chromium.

Preferably, the anode is a titanium foil or a titanium filter plate.

Preferably, the cathode is an electrically conductive metal or an electrically conductive non-metal.

Preferably, the cathode is a steel plate.

Preferably, the cathode is a porous conductive metal or a porous conductive non-metal, which enables uniform supporting of the nano-metal oxide inside the cathode homogeneously.

Preferably, in step 2, the revolution speed is 500~750 rpm.

The present disclosure devises a low-cost method for preparing a Nano-$TiO_2$ compound catalyst based on anodic oxidization for metal and electrically conductive carriers, which realizes simultaneous performance of the preparing process and the supporting process for Nano-$TiO_2$ particles under room temperature in a same reaction pool; moreover, the anode pure titanium material can be repetitively used for supporting for different carriers, till being completely converted into $TiO_2$ nano tubes/nano particles. The whole film preparation method further offers advantages such as simple instrumentation, mild preparation condition, easy operation, and low cost, etc. The nano film attached to the carrier metal, as prepared by the present disclosure, is firmly supported and hard to shed off; besides, the surface is dense and homogeneous, without fractures.

BRIEF DESCRIPTION OF THE DRAWINGS

FIG. 1 is a structural schematic diagram of reaction equipment according to the present disclosure.

DETAILED DESCRIPTION OF EMBODIMENTS

Hereinafter, the technical solution of the present disclosure will be further illustrated with reference to the accompanying drawings and preferred embodiments.

The reaction equipment adopted by the present disclosure, as shown in FIG. 1, comprises:

a reaction pool 10 in which electrolyte 11 is contained, wherein anode 12 and cathode 13 are dipped in the electrolyte 11 and positioned oppositely;

a magnetic stirrer 20 including a rotor 21, wherein the reaction pool 10 is disposed above the magnetic stirrer 20, and the rotor 21 is disposed in the reaction pool;

a fixture for fixing the cathode and the anode, comprising a fixing frame 31 and a sliding plate 32 which is connected to the cathode and the anode respectively;

a movable assembly for moving the cathode and the anode, comprising a guide rail 41 and a screw 42 which is connected to the sliding plate, wherein the screw 42 is further connected to an electric motor 43 and controlled by a control system such as a computer 44; and a power supply 50, the positive electrode of which is connected to the anode 12 and the negative electrode of which is connected to the cathode 13.

Hereinafter, the basic principle of the present disclosure will be illustrated with reference to a prophetic example using pure titanium as anode: in the reaction equipment, titanium dioxide nano tubes/nano particles are generated on the anode through anodic oxidization; due to the "field-assisted dissolution" and the fluorion effect-enhanced dissolution, the $TiO_2$ nano tubes/nano particles generated by the anode are also subjected to electrochemical corrosion during the growing process: $TiO_2 + 6F^- + 4H^+ \rightarrow [TiF_6]^{2-} + 2H_2O$. Therefore, the process of generating the nano tubes by anode oxidization occurs in an "up-down" fashion, i.e., the nano tubes at the top are first generated and continuously exposed to the fluoric electrolyte and the electric field, such that the tube wall is continuously eroded, thinned, and locally fractured. Further, the rate of fracturing the $TiO_2$ nanotubes may also increase by increasing the electrolyte stirring power. The resultant micro $TiO_2$ nanotube fragments enter the electrolyte. With increase of oxidization time and under the action of stirring, the nano tubes/nano particles are dissolved and shed off into the electrolyte, forming a stable colloidal dispersant gel. According to the electrodynamic effect in the electrochemical principle, a dual-electronic layer is created at the solid-liquid phase boundary, which has an ion adsorption property. At this time, the surplus charges are not present inside the solid, but on the surface. Therefore, due to electrostatic interactions with the solvent molecules, these particles ($TiO_2$ nano tube fragments) adsorb positive ions to obtain surface positive charges. Under the action of the electric field force, these "charged" particles tend to migrate freely towards the cathode (oppositely charged electrode) in the electrolyte. This phenomenon is usually referred to as "electrophoresis". When these charged particles reach the oppositely charged electrode, they lose surface charges to become electrically neutral, i.e., deposited at the cathode. The dissolved and shed-off nano fragments migrate towards the cathode and are adhered to the surface of the cathode material, thereby forming a Nano-$TiO_2$ film. For the nano tubes prepared conventionally by anodic oxidization on the anode and grown in the electrochemical corrosion, the bottom part of the nano tubes is insecurely adhered to the titanium carrier. In contrast, in the present disclosure, the nano particles in the electrolyte are adhered to the cathode metal plate through electrophoretic deposition, which are thus firmer and more homogeneous.

The "field-assisted dissolution" herein means that the electric field at the interface dual-electronic layer and an externally applied electric field would affect ion migration in the oxide; the "field-assisted dissolution" in conjunction with the fluorion effect can explain the generation and dissolution mechanism of $TiO_2$ nano tubes.

Specific preparation steps are provided below:

S1: building reaction equipment (as shown in FIG. 1), wherein a computer 44 is used for setting, wherein a screw 42 is controlled by an electric motor 43 such that anode 12 moves on a guide rail 41, and wherein the spacing between the cathode 13 and the anode 12 is maintained to be 2 cm;

S2: preparing electrolyte 11, compositions of which are 1M$(NH_4)_2SO_4$+0.5 wt % $NH_4F$, wherein the height of liquid surface should be sufficient for dipping a sample;

S3: stirring the electrolyte 11 with a magnetic stirrer 20 at a constant speed, wherein the revolution speed is usually not higher than 750 rpm. Due to limitations of currently available stirrers in the lab, the revolution speed shouldn't be higher than 750 revolutions/minute. A stirrer of another brand or form may also be used to increase the revolution speed as long as it works stably without skipping. The degrading rate of $TiO_2$ nano tubes may also increase through enhancement means such as increasing the power of the magnetic stirrer and applying additional ultrasonic waves, etc.

S4: using pure titanium (e.g., titanium foil, titanium filter plate, etc.) as anode material, and a carrier metal (e.g., steel plate) as the cathode material (other conductive metals may also be used as the cathode material).

S5: connecting to a power supply 50, wherein the output voltage is usually set between 10~50 v; and switching on the power supply.

S6: subjecting the pure titanium material connected to the positive electrode to anodic oxidation reaction, where $TiO_2$ nano tubes/nano particles are generated on the surface.

S7: with increase of oxidization time and under the action of stirring, the $TiO_2$ nano tubes/nano particles on the anode surface are dissolved and shed off into the electrolyte. Under the action of the electric field force, the dissolved and shed-off nano fragments migrate towards to the cathode and are adhered to the surface of the cathode material, thereby forming a TiO$_2$ nano film.

Prophetic Example 1

A stainless-steel plate (3 mm×2.5 mm×0.3 mm) is used as the carrier and a titanium foil (3 mm×2.5 mm×0.3 mm) is used as the cathode material. Specific steps are provided below:

Reaction equipment is built with the titanium foil as the anode material and the stainless-steel plate as the cathode material. 198 g (NH$_4$)$_2$SO$_4$ and 7.5 g NH$_4$F are taken and added into 1.5 L deionized water for sufficient dissolution to prepare electrolyte. The magnetic stirrer is set to 500 rpm; then, the magnetic stirrer is switched on and the rotor stirs the electrolyte at a constant speed. The power supply is connected and set to output a constant voltage of 20 v; the power supply is switched on; and the reaction lasts for 1.5 hours. The power supply and the magnetic stirrer are switched off; the cathode stainless-steel plate is removed and washed clean with deionized water, obtaining a nano titanium dioxide supported stainless-steel plate, the nano film thickness of which is 120 nm. The nano titanium dioxide supported stainless-steel plate is placed into a muffle furnace for high-temperature annealing, wherein the annealing condition is that the temperature rises to 450° C. at a rate of 1° C. per minute, and the temperature is maintained for 3 h and then cooled naturally to the room temperature along with the furnace temperature. The titanium dioxide nano compound catalytic material is thus generated.

The resultant titanium dioxide nano compound catalytic material is subjected to a photocatalytic experiment with methyl orange solution as the object of degradation. The nano-TiO$_2$ supported stainless-steel plate is put into a culture dish; 10 ml methyl orange solution with a concentration of 3×10$^{-5}$ mol/L is added into the culture dish; and the solution is let sit for 10 min. The UV light is turned on to irradiate the stainless-steel plate in the solution. The timing begins. The concentration of the methyl orange solution is measured once every 30 min, till the fourth time of measurement. Its 2 h degradation rate is measured and calculated as about 15%.

Prophetic Example 2

A stainless-steel plate (3 mm×2.5 mm×0.3 mm) is used as the carrier and a porous titanium plate (3 mm×2.5 mm×0.3 mm, aperture 70 μm) is used as the anode material. Specific steps are provided below:

Reactor equipment is built with the porous titanium plate as the anode material and the stainless-steel plate as the cathode material. 198 g (NH$_4$)$_2$SO$_4$ and 7.5 g NH$_4$F are taken and added into 1.5 L deionized water for sufficient dissolution to prepare electrolyte. The magnetic stirrer is set to 750 rpm; then, the magnetic stirrer is switched on and the rotor stirs the electrolyte at a constant speed. The power supply is connected and set to output a constant voltage of 20 v; the power supply is switched on; and the reaction lasts for 1 hour. The power supply and the magnetic stirrer are switched off; the cathode stainless-steel plate is removed and washed clean with deionized water, obtaining a nano titanium dioxide supported stainless-steel plate, the nano film thickness of which is 500 nm. The nano titanium dioxide supported stainless-steel plate is placed into a muffle furnace for high-temperature annealing, wherein the annealing condition is that the temperature rises to 450° C. at a rate of 1° C. per minute, and the temperature is maintained for 3 h and then cooled naturally to the room temperature along with the furnace temperature. The titanium dioxide nano compound catalytic material is thus generated.

The resultant titanium dioxide nano compound catalytic material is subjected to a photocatalytic experiment with methyl orange solution as the object of degradation. The nano-TiO$_2$ supported stainless-steel plate is put into a culture dish; 10 ml methyl orange solution with a concentration of 3×10$^{-5}$ mol/L is added into the culture dish; and the solution is let sit for 10 min. The UV light is turned on to irradiate the stainless-steel plate in the solution. The timing begins. The concentration of the methyl orange solution is measured once every 30 min, till the fourth time of measurement. Its 2 h degradation rate is measured and calculated as about 35%.

The anode material herein may be selected from any in the group consisting of titanium (Ti), aluminum (Al), tungsten (W), and chromium (Zr), etc.; the method described herein implements supporting of the oxide, and may even implement supporting of a metal oxide with multiple layers or compound layers through different anode combinations and time-sequential anodic oxidizations.

The electrolyte herein may also be selected from any of 1M NaH$_2$PO$_4$+0.3 wt % HF, 0.05 M NaClO$_4$+0.05 M NaCl, and 1 M Na$_2$SO$_4$+0.5 wt % NaF.

Due to presence of field-assisted dissolution during anodic oxidization, and in further conjunction with the stirring force subjected on the anode metal oxide after setting the magnetic stirrer to 500~750 rpm, a process in which nano particles enter the electrolyte and are then adhered on the cathode material may be implemented by adjusting the compositions of the electrolyte and the magnitude of the anodic oxidization voltage. With a porous cathode, the method described herein may also achieve a homogenous adhesion inside of the cathode.

Although the contents of the present disclosure have been described in detail through the foregoing preferred embodiments, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

We claim:

1. A preparation method of a nanometer metal oxide supported carrier based on anodic oxidation, comprising:

Step 1: adding an electrolyte to a reaction pool, and fixing a cathode and an anode oppositely, wherein the cathode is a metal plate that is identical to the carrier of the nano metal oxide supported carrier and the anode is a metal plate;

Step 2: stirring the electrolyte with a magnetic stirrer at a constant speed, wherein the revolution speed of the magnetic stirrer is not lower than 500 revolutions per minute;

Step 3: switching power on to the reaction pool; setting the output voltage between 10v and 50v of the reaction pool; and subjecting the anode metal plate to an anodic oxidation reaction, wherein metal oxide nanotubes and/or metal oxide nanoparticles are generated on the surface of the anode metal plate; with increase of oxidization time and under the action of stirring, the metal oxide nanotubes and/or metal oxide nanoparticles on the surface of the anode metal plate are dissolved and shed off into the electrolyte to obtain dissolved and shed-off nano fragments; under the action of an electric field force, the dissolved and shed-off nano fragments migrate towards the cathode and adhere to the surface of the cathode, thereby forming a nanometer metal oxide supported carrier.

2. The preparation method of a nanometer metal oxide supported carrier based on anodic oxidation according to claim 1, wherein the electrolyte is selected from any one of 1M $(NH_4)_2SO_4$+0.5 wt % $NH_4F$, 1M $NaH_2PO_4$+0.3 wt % HF, 0.05M $NaClO_4$+0.05M NaCl, and 1M $Na_2SO_4$+0.5 wt % NaF.

3. The preparation method of a nanometer metal oxide supported carrier based on anodic oxidation according to claim 1, wherein the spacing between the cathode and the anode is maintained in a range from 0.5 cm to 25 cm.

4. The preparation method of a nanometer metal oxide supported carrier based on anodic oxidation according to claim 1, wherein the anode is selected from any one of metal titanium, aluminum, tungsten, and chromium.

5. The preparation method of supporting a nanometer metal oxide based on anodic oxidation according to claim 4, wherein the anode is a titanium foil or a titanium filter plate.

6. The preparation method of a nanometer metal oxide supported carrier based on anodic oxidation according to claim 1, wherein the cathode is an electrically conductive metal or an electrically conductive non-metal.

7. The preparation method of a nanometer metal oxide supported carrier based on anodic oxidation according to claim 6, wherein the cathode is a steel plate.

8. The preparation method of a nanometer metal oxide supported carrier based on anodic oxidation according to claim 6, wherein the cathode is a porous conductive metal or a porous conductive non-metal.

9. The preparation method of a nanometer metal oxide supported carrier based on anodic oxidation according to claim 1, wherein in step 2, the revolution speed is 500~750 revolutions per minute.

* * * * *